(12) United States Patent
Kubo

(10) Patent No.: US 8,531,931 B2
(45) Date of Patent: Sep. 10, 2013

(54) OPTICAL DISK INSPECTING APPARATUS AND METHOD

(75) Inventor: Mitsumasa Kubo, Tachikawa (JP)

(73) Assignee: TEAC Corporation, Tama-shi, Tokyo (JP)

( * ) Notice: Subject to any disclaimer, the term of this patent is extended or adjusted under 35 U.S.C. 154(b) by 965 days.

(21) Appl. No.: 12/577,049

(22) Filed: Oct. 9, 2009

(65) Prior Publication Data

US 2010/0091626 A1 Apr. 15, 2010

(30) Foreign Application Priority Data

Oct. 10, 2008 (JP) ................. 2008-263766

(51) Int. Cl.
*G11B 7/00* (2006.01)
(52) U.S. Cl.
USPC ...................................... 369/53.35
(58) Field of Classification Search
None
See application file for complete search history.

(56) References Cited

U.S. PATENT DOCUMENTS

| | | | |
|---|---|---|---|
| 7,649,817 B2 * | 1/2010 | Choo et al. ............... | 369/47.44 |
| 8,040,766 B2 * | 10/2011 | Lee et al. ................. | 369/44.32 |
| 2006/0262687 A1 | 11/2006 | Minemura | |

FOREIGN PATENT DOCUMENTS

| | | |
|---|---|---|
| JP | 10-21548 A | 1/1998 |
| JP | 2000276733 A | 10/2000 |
| JP | 2004326939 A | 11/2004 |
| JP | 2005085406 A | 3/2005 |
| JP | 2005-243099 A | 9/2005 |
| JP | 2006221696 A | 8/2006 |

OTHER PUBLICATIONS

German Office Action, for corresponding German Application No. 10 2009 044 227.8, dated Aug. 11, 2011, 10 pages. (with English Translation).
Motoo Terasaki, "Point for Selecting Writing Software," DOS/V Magazine, Softbank Publishing Inc., 2000, vol. 9, No. 3, 6 pages.
Japanese Office Action for corresponding JP Application No. 2008-263766, mailed Feb. 21, 2012, 6 pages.

* cited by examiner

*Primary Examiner* — Joseph Feild
*Assistant Examiner* — Parul Gupta
(74) *Attorney, Agent, or Firm* — Seed IP Law Group PLLC

(57) ABSTRACT

An optical disk inspecting apparatus 10 plays an optical disk at a high speed and determines, based on error information provided during the high-speed reproduction, whether or not errors of a number exceeding a first threshold value have occurred. Then, when it is determined that errors of a number exceeding a first threshold value have occurred, the optical disk inspecting apparatus 10 performs high-speed principal determination of executing high-speed reproduction in this segment and determining presence or absence of errors of a number exceeding a second threshold value and also performs low-speed principal determination of executing low-speed reproduction in this segment and determining presence or absence of errors of a number exceeding the second threshold value. When errors of a number exceeding the second threshold value are detected, it is determined that there is a defect, and NG is outputted.

9 Claims, 2 Drawing Sheets

OPTICAL DISK INSPECTING APPARATUS AND METHOD

PRIORITY INFORMATION

This application claims priority to Japanese Patent Application No. 2008-263766, filed on Oct. 10, 2008, which is incorporated herein by reference in its entirety.

BACKGROUND

1. Technical Field

The present invention relates to an optical disk inspecting apparatus and method for inspecting presence or absence of a defect in an optical disk.

2. Related Art

Optical disks have been widely known which can irradiate laser light and thereby record or reproduce data; and when there is a flaw or the like on the recording surface of these optical disks, it may be difficult to reproduce data. Accordingly, when an optical disk is lent or sold, presence or absence of a defect such as a flaw on the recording surface must be preliminarily inspected. Particularly, in optical disk rental shops and secondhand disk shops where the quality of optical disk is difficult to ensure, such inspection is highly needed. Thus, many apparatuses for inspecting an optical disk have hitherto been proposed (for example, JP 2005-243099 A and JP 10-21548 A).

Here, in inspecting an optical disk, determination is ordinarily made based on the reproduction quality or the like in reproducing the optical disk; but in order to shorten the reproduction time (inspection time) for this inspection, the optical disk may be played at a high speed (for example, speed 24 times as high). However, problems caused by a flaw on the recording surface rarely occur at a high speed, but are more likely to occur at a low speed. Accordingly, an optical disk determined to be flawless in high-speed reproduction may not be played normally in low-speed (the same speed) reproduction. In order to avoid this problem, according to related art, an optical disk is played at a low speed over the whole surface to inspect for presence or absence of a defect in the optical disk. In this case, there arises a problem that it takes a long time to inspect the optical disk.

Thus, it is an advantage of the present invention to provide an inspecting apparatus and method which can more quickly detect presence or absence of a defect in an optical disk.

SUMMARY

According to the present invention, there is provided an optical disk inspecting apparatus which inspects presence or absence of a defect in an optical disk, the apparatus including: a reproduction unit which produces reproduction data based on reflected light when the optical disk is irradiated with laser light while being rotated and which can execute high-speed reproduction of playing the optical disk at a first rotation speed and low-speed reproduction of playing the optical disk at a second rotation speed lower than the first rotation speed; an error information calculating unit which calculates, based on the reproduction data, information on an error contained in the reproduction data to produce error information; and a control unit which controls the drive of the reproduction unit and the drive of the error information calculating unit and also determines, based on the calculated error information, presence or absence of a defect in the optical disk, wherein the control unit executes: a preliminary extraction processing for causing the reproduction unit to execute the high-speed reproduction and also preliminarily extracting, based on the error information or RF information provided during the high-speed reproduction, a segment which has a high possibility of including a defect; and a low-speed principal determination processing for causing the reproduction unit to execute the low-speed reproduction in the preliminarily extracted segment and also performing principal determination on presence or absence of a defect based on the error information provided during the low-speed reproduction. Here, "low-speed reproduction of playing the optical disk at a second rotation speed" includes not only real low-speed reproduction in which a reproduction signal is acquired while the optical disk is rotated at a second speed, but also virtual low-speed reproduction in which the optical disk is rotated at a speed higher than the second speed while the value of control parameter such as servo gain is set to a value by which error information equivalent to when the optical disk is played at the real low speed is provided.

According to a preferred aspect, the control unit further causes the reproduction unit to execute the high-speed reproduction in the preliminarily extracted region and also executes a high-speed principal determination processing for performing principal determination on presence or absence of a defect based on the error information provided during the high-speed reproduction.

According to another preferred aspect, the error information corresponds to the number of errors contained in the reproduction data, and the control unit preliminarily extracts, during the preliminary extraction processing, a segment in which the number of errors exceeds a first threshold value preliminarily set, as a segment which has a high possibility of including a defect, and during the principal determination processing, determines that there is a defect, when the number of errors exceeds a second threshold value, wherein the second threshold value corresponds to the number of errors permitting data reproduction in a disk player which guarantees reproduction, and the first threshold value is smaller than the second threshold value. Here, when the optical disk is a CD-system optical disk, the first threshold value corresponds to the number of errors correctable by a C1 correction process, and the second threshold value corresponds to the number of errors correctable when the C1 correction process and a C2 correction process without erasure correction are both executed; and when the optical disk is a DVD-system optical disk, the first threshold value corresponds to the number of errors correctable by a PI correction process, and the second threshold value corresponds to the number of errors correctable when the PI correction process and a PO correction process without erasure correction are both executed.

According to another preferred aspect, the first rotation speed is equal to or greater than a maximum speed in a range of disk rotation speed which guarantees the playing of the optical disk, and the second rotation speed is a lowest speed in a range of disk rotation speed which guarantees the playing of the optical disk. Preferably, the control unit performs the low-speed principal determination processing only in a segment determined to be flawless in the high-speed principal determination processing.

According to another preferred aspect, a detection unit is further included which detects a value of drive current flowing in an actuator for driving a pickup objective lens, and the control unit also compares the value of drive current detected during the principal determination with a reference current value preliminarily set, and determines that there is a defect in the preliminarily extracted segment, when the value of drive current exceeds the reference current value.

According to the present invention, there is provided an optical disk inspecting method for inspecting presence or absence of a defect in an optical disk, the method including: a preliminary extraction step of executing high-speed reproduction of playing the optical disk at a first rotation speed and also preliminarily extracting, based on error information or RF information provided during the high-speed reproduction, a segment which has a high possibility of including a defect; and a low-speed principal determination step of executing, in the segment preliminarily extracted in the preliminary extraction step, low-speed reproduction of playing the optical disk at a second rotation speed lower than the first rotation speed and also performing principal determination on presence or absence of a defect in the preliminarily extracted segment based on error information provided during the low-speed reproduction.

According to the present invention, a defective place is preliminarily extracted at a high speed, and low-speed principal determination is executed only in the extracted segment. Consequently, presence or absence of a defect in an optical disk can be detected more quickly.

DETAILED DESCRIPTION

Figure 1:
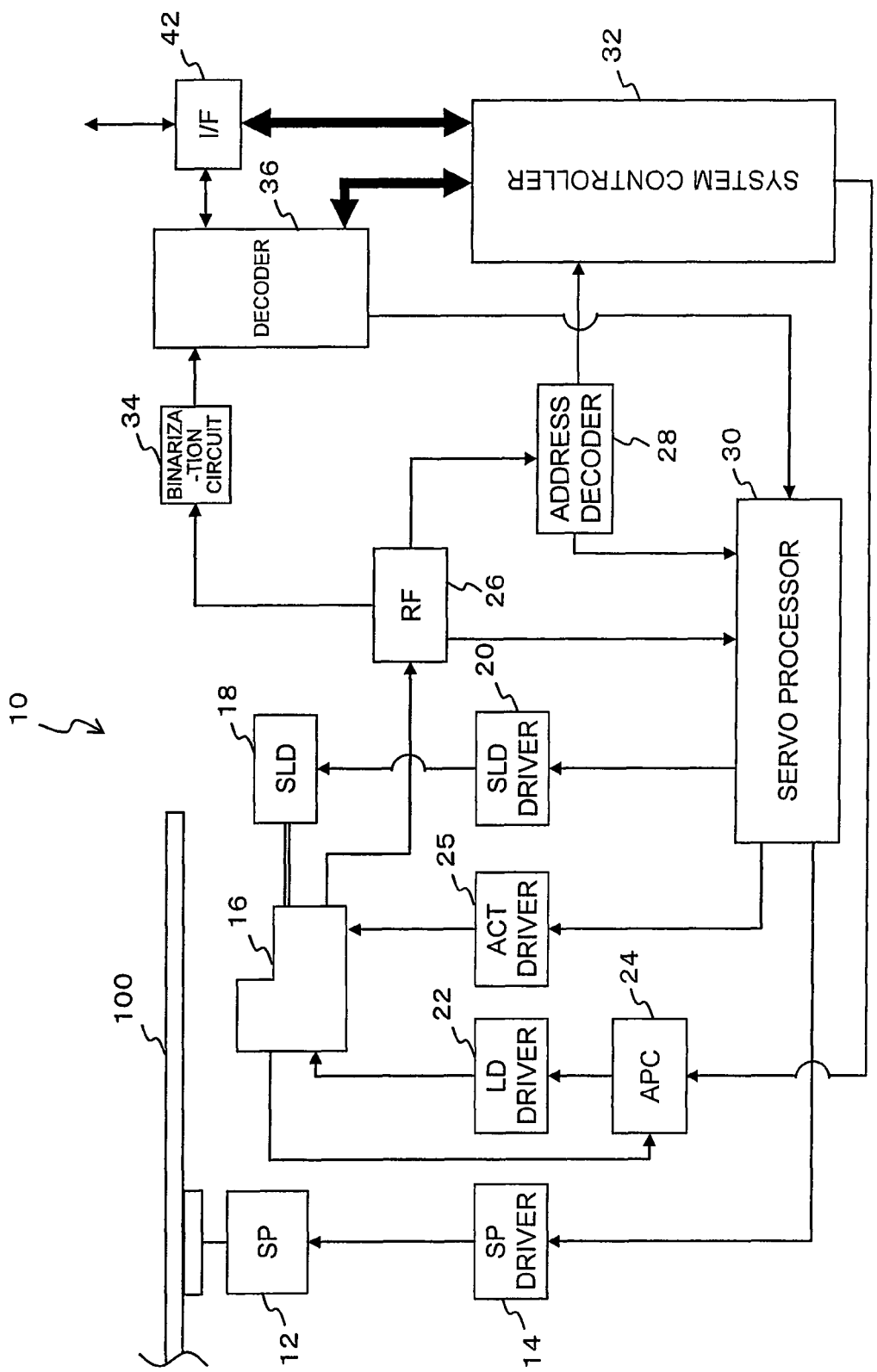
FIG. 1 is a schematic configuration diagram of an optical disk inspecting apparatus according to an embodiment of the present invention.

The present invention will be described below with reference to the drawings showing an embodiment thereof. FIG. 1 is a block diagram illustrating a configuration of a disk inspecting apparatus 10 according to an embodiment of the present invention. The optical disk inspecting apparatus 10 is an apparatus used to inspect presence or absence of a problems (defect) which makes it difficult to play an optical disk, such as local radial runout, meandering track, and disk recording surface flaw. The configuration of the disk inspecting apparatus 10 will be described in detail below.

An optical disk 100 to be inspected such as CD or DVD is driven to rotate by a spindle motor 12 (SP). The spindle motor 12 is driven by an SP driver 14, and the SP driver 14 is servo-controlled by a servo processor 30 to have a desired rotation speed.

The optical pickup 16 includes a laser diode (LD) used to irradiate the optical disk 100 with laser light and a photo detector which receives reflection light from the optical disk 100 and converts the light into an electrical signal, and is arranged to face the optical disk 100. The optical pickup 16 is driven in a radial direction of the optical disk 100 by a sled motor 18 (SLD); and the sled motor 18 is driven by an SLD driver 20. The SLD driver 20 is, similarly to the SP driver 14, servo-driven by the servo processor 30. The laser diode of the optical pickup 16 is driven by an LD driver 22, and the LD driver 22 is controlled by an automatic power controller (APC) 24 so that the drive current has a desired value. The APC 24 and the LD driver 22 control light emission of the laser diode according to a command from a system controller 32. Referring to FIG. 1, the LD driver 22 is arranged separately from the optical pickup 16, but the LD driver 22 may be mounted in the optical pickup 16. The optical pickup 16 includes an actuator (ACT) which drives an objective lens, and the actuator is driven by an ACT driver 25. The ACT driver 25 is servo-driven by the servo processor 30 so that a desired driving amount is provided.

In inspecting the optical disk 100, data recoded on the optical disk 100 is reproduced. In reproducing the data, laser light of a reproduction power is irradiated from the laser diode of the optical pickup 16, and reflection light thereof is converted into an electrical signal by the photo detector and outputted as a reproduction signal. The optical pickup 16, spindle motor 12, sled motor 18, and various types of drivers 14, 20, 22 and 25, which are all related to the reproduction signal generation, function as a reproduction unit.

The reproduction signal from the optical pickup 16 is supplied to an RF circuit 26. The RF circuit 26 produces a focus error signal and tracking error signal from the reproduction signal, and supplies the signals to the servo processor 30. The servo processor 30 servo-controls the optical pickup 16 based on these error signals so that the optical pickup 16 is maintained at an on-focus state and on-track state. Also, the RF circuit 26 supplies an address signal contained in the reproduction signal to an address decoder 28. The address decoder 28 decodes the address signal to produce address data of the optical disk 100, and supplies the data to the servo processor 30 and the system controller 32.

Wobble signal is an exemplary address signal. Tracks of the optical disk 100 are wobbled using a modulation signal being time information indicating an absolute address of the optical disk 100, and the wobble signal is extracted from the reproduction signal and decoded, whereby address data (ATIP) is provided. Also, the RF circuit 26 supplies the reproduction RF signal to a binarization circuit 34. The binarization circuit 34 binarizes the reproduction signal and supplies the resultant signal to the decoder 36.

The decoder 36 decodes the binary signal. The decoder 36 functions as an error information calculating unit and calculates, based on the received binary signal, error information, i.e., information on errors contained in the binary signal. According to the present embodiment, information on success or failure of C1 correction process or C2 double correction process, or information on success or failure of PI correction process or PO correction process, is used as the error information.

Here, the C1/C2 correction process is a correction process constituted of two systems performed by CIRC (Cross Interleave Reed Solomon Code) being a function of correcting data error in a CD-system optical disk. In the first system, short error (C1) called a random error is mainly corrected, and in the second system, long error (C2) called a burst error is mainly corrected. Data of long error (C2) is dispersed and converted into the data of short error so that the error correction is facilitated. In an ordinary disk player, after the C1 correction process has been applied to the reproduction data provided, the C2 correction process is applied. The PI/PO correction process is a function similar to the one above, which corrects data error in a DVD-system disk. In an ordinary disk player, the PI correction process and PO correction process are repeated two times. Here, the number of correctable errors is preliminarily set for each correction process, and when the number is exceeded, the decoder 36 outputs to the system controller 32, information indicating that the correction process cannot be executed, as the error information. Instead of the information on success or failure of the correction process, the error number itself may be outputted as the error information to the system controller 32.

According to the present embodiment, when a CD-system optical disk is inspected, the quality of the disk is checked based on information on success or failure of the C1 correction process or C2 correction process, and when a DVD-system optical disk is inspected, the quality of the disk is checked based on information on success or failure of the PI correction process or PO correction process.

The system controller 32 is a section which controls the operation of the whole system. When it is detected that the optical disk 100 has been mounted, the system controller 32 according to the present embodiment controls the operation of each section to execute disk inspection processing for checking the quality of the optical disk 100, i.e., presence or absence of a defect in the optical disk 100, which can make it difficult to properly execute reproduction.

Before describing the procedure of the disk inspecting processing, defects produced in the optical disk 100 will be briefly described. As defects which make it difficult for the optical disk 100 to be properly played, there are: a defect (hereinafter referred to as "manufacturing defect") such as local radial runout and meandering track of the optical disk 100, which are produced during disk manufacturing; and a defect (hereinafter referred to as "post-manufacturing defect") such as a recording surface flaw of the optical disk 100, which is produced by careless handling after manufacturing of the optical disk 100. It is known that, for the manufacturing defect, a problem is more likely to occur in high-speed reproduction than in low-speed (for example, the same speed) reproduction. It is also known that, for the post-manufacturing defect, a problem is more likely to occur in low-speed reproduction than in high-speed reproduction.

Consequently, in order to determine whether or not reproduction is possible without causing a problem in both an ordinary low-speed player and a high-speed reproduction drive mounted in a PC or the like, inspections in both low-speed reproduction and high-speed reproduction must be executed according to related art. However, it takes a long time and labor to perform an inspection at only a low speed or at both a low speed and a high speed. Particularly, in a related art inspection at a low-speed, reproduction is executed over the whole surface of the optical disk at a low-speed, which takes a long time.

Thus, according to the present embodiment, firstly a segment having a possibility of including a defect is schematically extracted based on an error number (or information on success or failure of the correction process) provided in high-speed reproduction. Then, only for the extracted section, an inspection of presence or absence of a defect at a high-speed and an inspection of presence or absence of a defect at a low-speed are performed. The procedure of this defect inspecting processing will be described with reference to FIG. 2.

Figure 2:
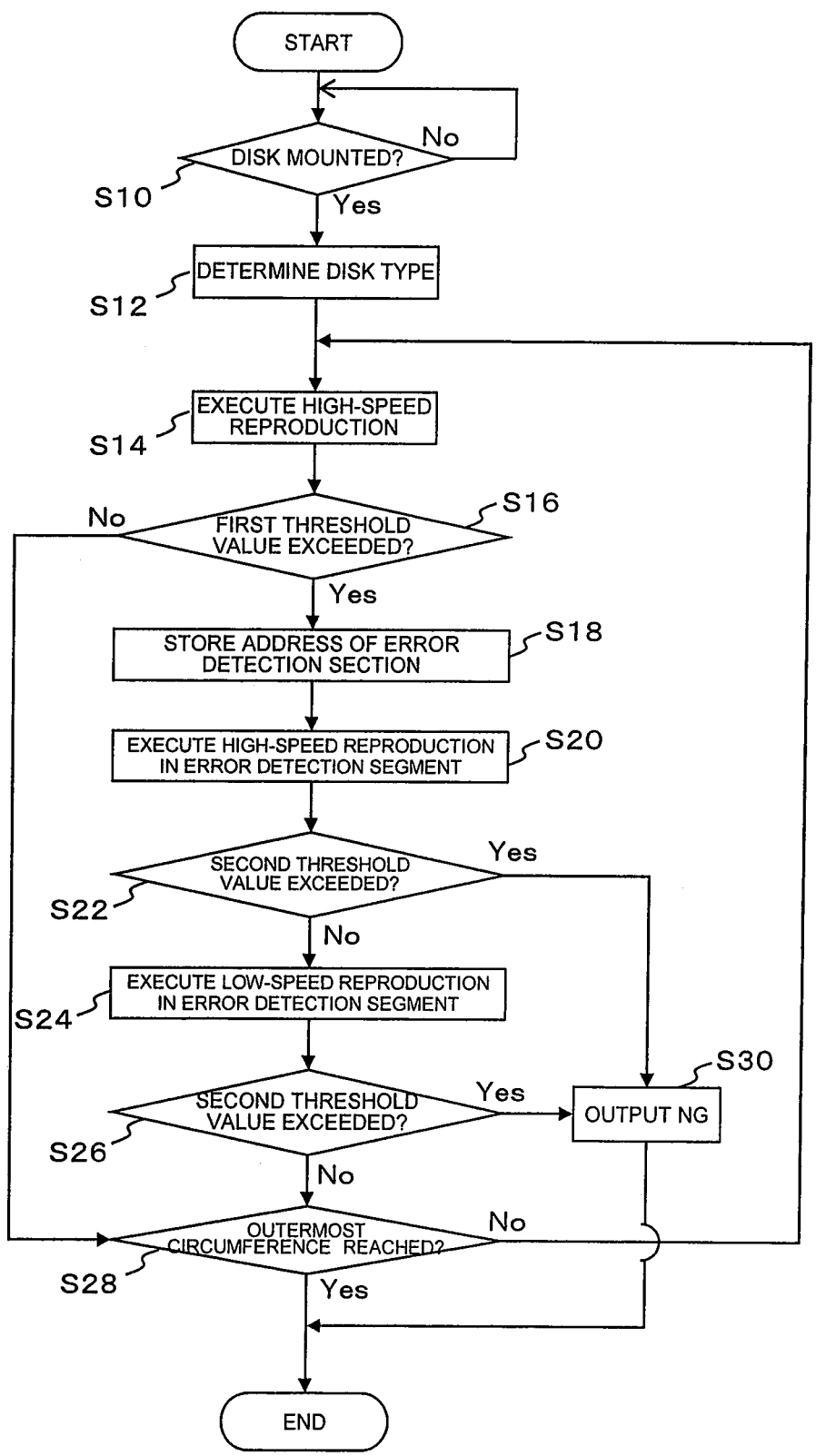
FIG. 2 is a flowchart illustrating the procedure of a disc inspecting processing according to the present embodiment.

FIG. 2 is a flowchart illustrating the procedure of a defect inspecting processing according to the present embodiment. When it is detected that the optical disk 100 inspected has been mounted in an inspecting apparatus 10 (Yes in S10), firstly the system controller 32 determines the type of the disk (S12). As a result of the determination, when the mounted optical disk 100 is a CD-system optical disk, information on success or failure of a C1/C2 correction process is set as the error information. When the mounted optical disk 100 is a DVD-system optical disk, information on success or failure of a PI/PO correction process is set as the error information.

Subsequently, in order to execute high-speed reproduction of the optical disk 100, the system controller 32 outputs a drive command to the servo processor 30, the APC 24 and the like (S14). Here, the reproduction speed (disk rotation speed) is preferably equal to or greater than a maximum speed in a range of reproduction speed at which it is required to guarantee reproduction. Accordingly, in a player capable of reproduction at a speed 24 times as high, when it is required to guarantee reproduction, the optical disk 100 is played at a speed equal to or greater than a speed 24 times as high in this step S14.

In this high-speed reproduction, the decoder 36 determines whether or not errors of a number exceeding the first threshold value preliminarily set have been detected (S16). Here, this first threshold value is a threshold value used in preliminary extraction processing which preliminarily extracts a segment having a high possibility of including a defect, and is set to schematically extract a segment having a high possibility of including a manufacturing defect and post-manufacturing defect. In other words, the first threshold value is set to a value by which both the manufacturing defect and post-manufacturing defect can be unfailingly detected, that is, a value at which less severe quality problems can be detected. According to the present embodiment, the number of errors correctable by a C1 correction process or PI correction process is set as the first threshold value.

More specifically, in a CD-system optical disk, reed solomon code (C2 code) for correction against burst error is added to the original data and dispersed over multiple frames. Then, reed solomon code (C1 code) is further added to each frame. Firstly the decoder 36 applies an intra-frame correction process (C1 correction process) using C1 code to the read data. The number of errors per frame (C1 correction limit value) correctable by this C1 correction process is preliminarily set. Correction is not performed for a frame in which errors of a number exceeding the C1 correction limit value have occurred, and the errors uncorrectable by C1 correction remain to be corrected. Data with the errors uncorrectable by C1 correction is ordinarily corrected using C2 code. In other words, when errors uncorrectable by C1 correction can be corrected by a C2 correction process, there is no problem. An error uncorrectable by a C2 correction process is called a C2 uncorrectable error.

In step S14, a C2 correction process ordinarily performed is not performed, and only a C1 correction process is performed. Also, when C1 correction process is not properly performed, i.e., when there are errors of a number exceeding the C1 correction limit value in one frame, it is determined that the first threshold value has been exceeded. More specifically, when receiving information on failure of C1 correction process (occurrence of errors uncorrectable by C1 correction) from the decoder 36, the system controller 32 determines that errors of a number exceeding the first threshold value have occurred.

Similarly, in the case of a DVD-system optical disk, a typical disk player performs a PI correction process and thereafter performs a PO correction process. However, in step S14, a PO correction process is not performed and only a PI correction process is performed. When errors uncorrectable by this PI correction process occur, it is determined that the first threshold value has been exceeded. The above described configuration is merely exemplary of the present invention, and as the first threshold value, another value may be set with which both manufacturing defect and post-manufacturing defect can be unfailingly detected.

When high-speed reproduction is completed up to the outermost circumference of the optical disk 100 without exceeding the first threshold value (No in S16 and Yes in S28), it is determined that no defect has occurred in the optical disk 100, and the defect inspecting processing is finished.

However, when errors of a number exceeding the first threshold value are detected, it is determined that the error detection segment has a high possibility of including a manufacturing defect or a post-manufacturing defect. In this case, the system controller 32 issues a command of temporarily interrupting the high-speed reproduction and also stores the start address and end address of the error detection segment (S18). Then, based on the stored addresses, high-speed reproduction is executed again in the segment in which errors of a number exceeding the first threshold value have been detected (S20). In this case, the reproduction speed is, as in S14, equal to or greater than a maximum speed in a range of reproduction speed at which it is required to guarantee reproduction.

In this high-speed reproduction, the decoder 36 determines whether or not errors of a number exceeding the second threshold value preliminarily set have been detected (S22). Here, the number of errors unfailingly correctable in an ordinary disk player is set as the second threshold value. More specifically, the number of errors correctable by a C2 correction process (or PO correction process) may be set as the second threshold value. That is, in the high-speed reproduction of step S20, a C1 correction process is executed, and errors uncorrectable by the C1 correction process are corrected by the C2 correction process. Here, erasure correction is not performed in this C2 correction process. The reason is as follows: there is typically a variation in error correction capability of disk players on the market, and conditions (presence or absence of dust and the like) for actually playing a disk player also cause a variation in error correction capability. Consequently, an optical disk for which error correction can be properly performed (data can be properly reproduced) by effectively using the error correction capability of the inventive inspecting apparatus 10, may not be played by a disk player on the market. Thus, according to the present embodiment, the error correction capability is slightly reduced and the C2 correction process is performed without executing erasure correction. Then, when there are errors (errors in excess of a C2 correction process limit value) uncorrectable by this C2 correction process without erasure correction, the decoder 36 reports information on failure of the C2 correction process to the system controller 32. Upon receipt of this information, the system controller 32 determines that there are errors of a number exceeding the second threshold value in the segment of the optical disk (Yes in S22). Here, the C2 correction process (or PO correction process) limit value used to determine that no erasure correction is to be executed, is only an example of the present invention, and another value allowing proper correction may be set as the second threshold value in an ordinary disk player. In any case, in these steps S20 and S22, defect detection is performed in high-speed reproduction, so that it is possible to effectively detect a manufacturing defect, such as local facial runout and meandering track, readily causing a problem during high-speed reproduction, for example, during ripping.

In step S22, when it is determined that errors of a number exceeding the second threshold value have occurred, the system controller 32 reports to the user via an interface 42 (I/F), information indicating that the mounted optical disk 100 is a defective disk which includes a defect making it difficult to reproduce, and terminates the processing (S30). Here, the form of reporting the information on defective disk is not limited; for example, the information may be provided by lighting of a lamp or an alarm, or by a character string displayed on a liquid crystal panel arranged in the inspecting apparatus. In this case, as many items as possible may be provided, such as information on address of a defective section and defect type.

On the other hand, when errors of a number exceeding the second threshold value are not detected in high-speed reproduction, the flow proceeds to step S24. In step S24, low-speed reproduction is executed in the error detection segment stored in step S18. The reproduction speed in this low-speed reproduction is a minimum speed in a range of reproduction speed at which it is required to guarantee reproduction, and typically the same speed. Then, the system controller 32 determines under the low-speed reproduction state whether or not errors of a number exceeding the second threshold value are detected (S26). That is, when the second threshold value is set to a C2 correction (or PO correction) limit value corresponding to the number of errors correctable by C2 correction process (or PO correction process), in step S24, the decoder 36 executes a C2 correction process and also corrects errors uncorrectable by the C1 correction process through the C2 correction process. Here, the C2 correction process does not execute erasure correction. Then, when errors uncorrectable by the C2 correction process without erasure correction occur, the decoder 36 sends information on failure of the C2 correction process to the system controller 32. Upon receipt of this information, the system controller 32 determines that there are errors of a number exceeding the second threshold value in the segment of the optical disk. In these steps S24 and S26, defect detection is performed in low-speed reproduction, so that it is possible to effectively detect a post-manufacturing defect, such as a flaw or the like on the recording surface of a disk, readily causing a problem during low-speed reproduction, for example, during reproduction of ordinary music or video data.

According to the present embodiment, reproduction is performed at a low speed, i.e., while the disk rotation speed is set to a speed of the same speed. However, instead of actually rotating the optical disk 100 at a low speed, virtual low-speed reproduction may be performed in which the value of a control parameter such as servo gain is set to a value with which an error number equivalent to that in low-speed reproduction can be provided, while the optical disk 100 is rotated at a high-speed. According to this configuration, defect inspection can be performed more quickly.

Then, in S26, when errors of a number exceeding the second threshold value are detected, the step proceeds to step S30. Information indicating that the optical disk is defective is outputted and the defect inspection processing is terminated. However, in S26, when errors of a number exceeding the second threshold value are not detected, it is determined whether or not reproduction has been performed up to the outermost circumference of the disk (S28). As long as the outermost circumference has not been reached, steps S14 to S26 are repeated until the circumference is reached.

As evident from the above description, according to the present embodiment, firstly a segment having a high possibility of including a defect is preliminarily extracted by high-speed reproduction. Thereafter, in the extracted segment, defect detection (high-speed principal determination) by high-speed reproduction having a high accuracy of detecting a manufacturing defect, and defect detection (low-speed principal determination) by low-speed reproduction having a high accuracy of detecting a post-manufacturing defect are executed in this order. As a result, the time required to inspect a defect can be significantly shortened, compared to related art which the defect detection by high-speed reproduction and the defect detection by low-speed reproduction are separately executed.

According to the present embodiment, presence or absence of a defect is determined based only on the number of errors during reproduction, but another parameter may also be used as a criterion. For example, the drive current value of an actuator used to drive the pickup objective lens may also be used as a criterion. More specifically, as a defect which occurs in the optical disk 100, there is a defect with which the drive current of an actuator changes to an excessive value while the allowable reproduction quality is provided, and an excessive drive current caused by this defect may exert an adverse effect on the disk player. Thus, an allowable drive current value is preliminarily set as a reference current value, and a drive current is detected during reproduction in steps S20, S24 and the like and compared with the reference current value. When the detected drive current value exceeds the reference current value, it may be determined that the mounted disk is defective, while the number of errors is equal to or less than the second threshold value. According to the present embodiment, the preliminary extraction processing (S14 to S18) is performed based on the number of errors (success or failure of C1 correction process), but the preliminary extraction may be performed based on a reproduction signal amplitude (RF amplitude) provided by the RF circuit 26. More specifically, when the RF amplitude provided during high-speed reproduction (S14) is equal to or less than a threshold value, it may be determined that this segment of the disk has a high possibility of including a manufacturing defect or post-manufacturing defect, and thus high-speed principal determination (S20 and S22) and low-speed principal determination (S24 and S26) are performed for this segment. When the mounted optical disk 100 has a serious defect and thus the address of an error producing section cannot be read and stored, also, information indicating that the disk is defective may be reported and the defect inspecting processing may be terminated.

According to the present embodiment, in order to shorten the inspection time, after execution of the high-speed principal determination (S20 and S22), the low-speed principal determination (S24 and S26) is executed, but this order may reversed. The above described optical disk inspecting apparatus may be constructed as a single inspecting apparatus, or may be incorporated into an optical disk recorder/player or the like. Further, according to the present embodiment, in order to guarantee not only low-speed reproduction of music or video data but also high-speed reproduction such as ripping, both the high-speed principal determination and low-speed principal determination are performed, but when there is no need to guarantee high-speed reproduction, or when reproduction speed is low, the high-speed principal determination (S20 and S22) may be omitted. More specifically, immediately after a segment having a problem in high-speed reproduction has been preliminarily extracted (S14 to S18), the low-speed principal determination (S24 and S26) is performed for the extracted segment. In the case of this exemplary application, also, defect inspection time can be significantly shortened, compared to a related art inspecting apparatus. More specifically, according to related art, when only low-speed reproduction is guaranteed, low-speed reproduction is executed over the whole surface of the disk to inspect presence or absence of a defect. According to the above exemplary application, however, low-speed reproduction is executed only for the preliminarily extracted segment, so inspection time can be significantly shortened, compared to related art.

What is claimed is:

1. An optical disk inspecting apparatus configured to inspect presence or absence of a defect in an optical disk, the apparatus comprising:
   a reproduction unit configured to produce reproduction data based on reflected light when the optical disk is irradiated with laser light while being rotated and which can execute high-speed reproduction of playing the optical disk at a first rotation speed and low-speed reproduction of playing the optical disk at a second rotation speed lower than the first rotation speed;
   an error information calculating unit configured to calculate, based on the reproduction data, information on an error contained in the reproduction data to produce error information; and
   a control unit configured to control the drive of the reproduction unit and the drive of the error information calculating unit and also configured to determine, based on the error information, presence or absence of a defect in the optical disk, wherein the control unit is configured to execute: preliminary extraction processing for causing the reproduction unit to execute the high-speed reproduction and also preliminarily extracting, based on the error information or RF amplitude provided during the high-speed reproduction, a segment which has a high possibility of including a defect; and low-speed principal determination processing for causing the reproduction unit to execute the low-speed reproduction in the preliminarily extracted segment among segments where the high-speed reproduction is executed and also performing principal determination on presence or absence of a defect based on the error information provided during the low-speed reproduction.

2. The optical disk inspecting apparatus according to claim 1,
   wherein the control unit is further configured to cause the reproduction unit to execute the high-speed reproduction in the preliminarily extracted segment and also to execute a high-speed principal determination processing for performing principal determination on presence or absence of a defect based on the error information provided during the high-speed reproduction.

3. The optical disk inspecting apparatus according to claim 1,
   wherein the error information corresponds to a number of errors contained in the reproduction data,
   wherein the control unit is configured to preliminarily extract, during the preliminary extraction processing, a segment in which the number of errors exceeds a first threshold value, as a segment which has a high possibility of including a defect, and during the low-speed principal determination processing, to determine that there is a defect when the number of errors exceeds a second threshold value,
   wherein the second threshold value corresponds to the number of errors permitting data reproduction in a disk player which guarantees reproduction, and
   wherein the first threshold value is smaller than the second threshold value.

4. The optical disk inspecting apparatus according to claim 3,
   wherein when the optical disk is a CD-system optical disk, the first threshold value corresponds to a number of errors correctable by a C1 correction process, and the second threshold value corresponds to a number of errors correctable when the C1 correction process and a C2 correction process without erasure correction are both executed, and
   wherein when the optical disk is a DVD-system optical disk, the first threshold value corresponds to a number of errors correctable by a PI correction process, and the second threshold value corresponds to a number of errors correctable when the PI correction process and a PO correction process without erasure correction are both executed.

5. The optical disk inspecting apparatus according to claim 1,
  wherein the first rotation speed is equal to or greater than a maximum speed in a range of disk rotation speed which guarantees the playing of the optical disk, and
  wherein the second rotation speed is a lowest speed in a range of disk rotation speed which guarantees the playing of the optical disk.

6. The optical disk inspecting apparatus according to claim 2,
  wherein the control unit is configured to perform the low-speed principal determination processing only in a segment determined to be flawless in the high-speed principal determination processing.

7. The optical disk inspecting apparatus according to claim 1,
  wherein the low-speed reproduction is a virtual low-speed reproduction in which, while a value of a control parameter related to reproduction is set to a value by which error information equivalent to that provided when the optical disk is rotated at the second rotation speed can be provided, the optical disk is rotated at a speed higher than the second rotation speed.

8. The optical disk inspecting apparatus according to claim 1, further comprising a detection unit configured to detect a value of drive current flowing in an actuator for driving a pickup objective lens,
  wherein the control unit is further configured to compare the value of drive current detected during the low-speed principal determination processing with a reference current value, and to determine that there is a defect in the preliminarily extracted segment, when the value of drive current exceeds the reference current value.

9. An optical disk inspecting method for inspecting presence or absence of a defect in an optical disk, the method comprising:
  a preliminary extraction step of executing high-speed reproduction of playing the optical disk at a first rotation speed and also preliminarily extracting, based on error information or RF amplitude provided during the high-speed reproduction, a segment which has a high possibility of including a defect; and
  a low-speed principal determination step of executing, in the segment preliminarily extracted in the preliminary extraction step, low-speed reproduction of playing the optical disk at a second rotation speed lower than the first rotation speed and also performing principal determination on presence or absence of a defect in the preliminarily extracted segment among segments where the high-speed reproduction is executed based on error information provided during the low-speed reproduction.

* * * * *